United States Patent [19]
Vogt

[11] Patent Number: 5,743,593
[45] Date of Patent: Apr. 28, 1998

[54] VEHICLE SEAT WITH INTEGRAL CHILD SEAT

[75] Inventor: Brandon Russell Vogt, Bloomfield Hills, Mich.

[73] Assignee: Lear Corporation, Southfield, Mich.

[21] Appl. No.: 700,727

[22] Filed: Aug. 9, 1996

[51] Int. Cl.$^6$ .................................................. A47C 15/00
[52] U.S. Cl. ............................. 297/238; 297/378.12
[58] Field of Search ..................... 297/378.12, 378.1, 297/238, 331, 335

[56] References Cited

U.S. PATENT DOCUMENTS

| | | | |
|---|---|---|---|
| 2,966,201 | 12/1960 | Strahler | 297/238 |
| 4,435,011 | 3/1984 | Hakamata | 297/238 X |
| 4,900,087 | 2/1990 | Crisp | 297/238 |
| 5,280,995 | 1/1994 | Elton . | |
| 5,380,060 | 1/1995 | Sponsler et al. . | |
| 5,383,707 | 1/1995 | Osenkowski et al. . | |

FOREIGN PATENT DOCUMENTS 6286509  10/1994  Japan ........................ 297/238

Primary Examiner—Milton Nelson, Jr.
Attorney, Agent, or Firm—Brooks & Kushman P.C.

[57] ABSTRACT

A seat assembly is disclosed comprising a pivotable backrest, an auxiliary seat, and first and second latches. The first latch is fixedly connected to the bottom cushion and pivotable about a pivot point between a deployed position and a stowed position. The first latch has an opening and a groove extending from the opening, the opening including an arcuate border having a substantially constant radius from the pivot point. The second latch includes a lower bracket arm and an upper bracket arm connected to the backrest, the upper bracket arm including a latch finger and a crank. In a first position, the latch finger engages a catch in the lower bracket arm to lock the backrest in the use position and a distal end of the crank extends into the opening of the first latch. In a second position, the latch finger does not engage the catch and the distal end of the crank extends into the groove of the first latch. The first latch inhibits movement of the second latch from its first position when the first latch is not in the stowed position.

19 Claims, 3 Drawing Sheets

VEHICLE SEAT WITH INTEGRAL CHILD SEAT

TECHNICAL FIELD

This invention relates to seats for motor vehicles, and more particularly to a latching mechanism to releasably retain a bottom cushion of a child seat in a stowed condition.

BACKGROUND ART

Some passenger seat assemblies in motor vehicles incorporate an integral child seat into a backrest portion. These integral child seats are more convenient than bulky strap-in-place child seats, and save space because the vehicle seat can be quickly converted between child and adult use.

Integral child seats typically include a rear cushion recessed in the backrest portion of the main seat assembly. A bottom cushion of the child seat pivots between a stored position and a deployed position. In the stored position, the bottom cushion is folded flat against the rear cushion, forming a flush surface in cooperation with the backrest portion of the seat. In the deployed position, the bottom cushion extends generally perpendicularly from the backrest to support the buttocks and legs of the child. Examples of vehicular seat assemblies including an integral child seat may be seen in U.S. Pat. No. 5,286,084 to Bart and U.S. Pat. No. 5,449,216 to Gierman et al.

The bottom cushion is typically retained in the stowed position by a friction-type latch which is overcome or released by a pulling force. For example, U.S. Pat. No. 5,280,995 to Elton shows a design in which two latch levers release the bottom cushion of the child seat from the stowed position to the deployed position upon a pulling force applied to the bottom cushion whenever the backrest portion of the main seat assembly is in the upright use position. U.S. Pat. No. 5,380,060 to Sponsler et al. and U.S. Pat. No. 5,383,707 to Osenkowski et al. show designs in which the bottom cushion is retained while the backrest portion in in the use position.

SUMMARY OF THE INVENTION

The present invention is a seat assembly comprising a backrest, a bottom cushion, and first and second latches. The backrest is movable between a use position and a storage position. The first latch has an opening and a groove extending from the opening, and is movable with the bottom cushion between a deployed position and a stowed position. The second latch is movable between a first position locking the backrest in the use position and a second position. In the first position, the second latch extends into the opening of the first latch. In the second position, the second latch extends into the groove of the first latch.

Accordingly, it is an object of the present invention to provide an assembly of the type described above which prevents deployment of an auxiliary seat when the main seat is not locked in an upright position.

Another object of the present invention is to provide an assembly of the type described above which prevents deployment of the main seat when the auxiliary seat is not locked in a stowed position.

Still another object of the present invention is to combine these objects through the use of an assembly that is simpler and less costly than prior art assemblies.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
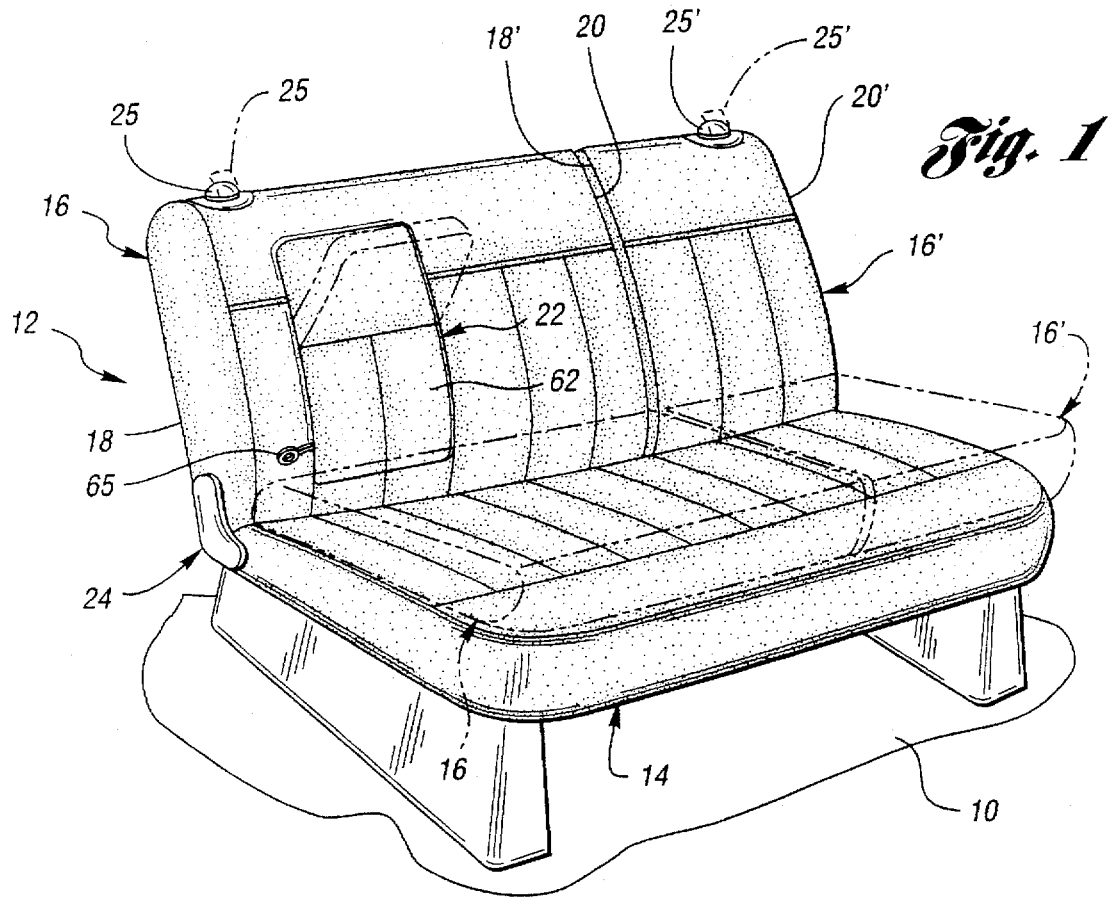
FIG. 1 is a simplified perspective view of a motor vehicle seat assembly according to the present invention having two backrest portions shown in a generally vertical use position and shown in a generally horizontal folded position in phantom.
Figure 2:
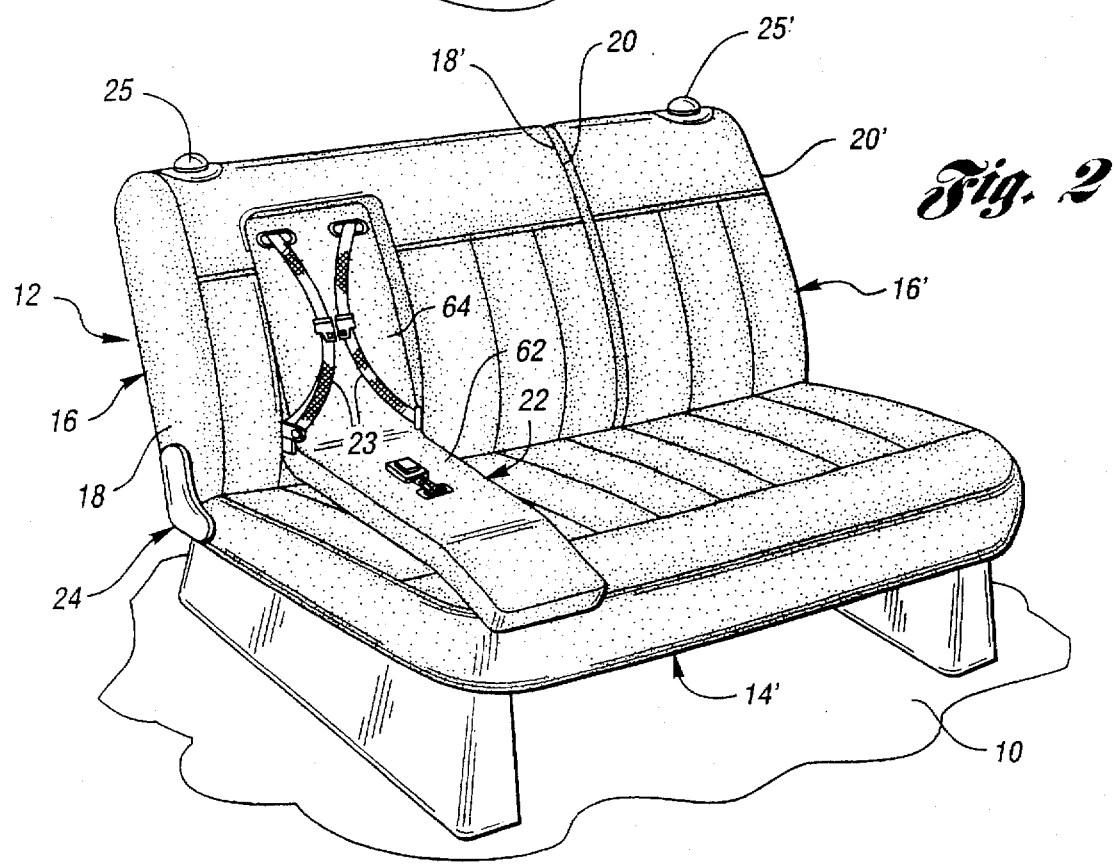
FIG. 2 is a perspective view similar to FIG. 1 and showing a bottom cushion of an integral child seat opened to a deployed position.

With reference to the drawings, the preferred embodiments of the present invention will be described. FIGS. 1 and 2 show a passenger compartment of a motor vehicle including a floor 10. A folding passenger seat assembly 12 secured to the floor 10 includes a seat 14 and a backrest 16. The backrest 16 has a left end 18 and a right end 20, and is of the 60/40 split type including a companion backrest 16' of unequal length which can be manipulated independently of the main backrest. Alternatively, the backrest 16 may be of the traditional full length, one-piece type which is coextensive with the seat 14.

In the case of the 60/40 split type seat assembly, those skilled in the art will appreciate that both the backrest 16 and its companion backrest 16' will have respective left ends 18, 18' and right ends 20, 20', and that the present invention may be practiced on either one or both of the backrests 16 and 16'. However, the specific components of the seat assembly 12 which are described below with reference to the left end 18 or the right end 20 will generally be reversed in connection with the companion backrest 16'. This is because the outboard end of the backrest 16 is the left end 18, whereas the outboard end of the companion backrest 16' is the right end 20' as viewed in FIG. 1. Similarly, the inboard end of the backrest 16 is the right end 20, whereas the inboard end of the companion backrest 16' is the left end 18'.

A hinge 24 is provided for arcuately moving the backrest 16 relative to the seat 14 between a generally vertical use position and a generally horizontal folded position shown in phantom in FIG. 1. A seat release lever 25 disposed conveniently along the top edge of the backrest 16 actuates a seat latch as described below so that the backrest can be folded to a horizontal non-use position. Of course, those skilled in the art will readily appreciate various other mounting locations and possible alternative embodiments for the seat release lever 25. The companion backrest 16' includes a seat release lever 25' positioned along its top edge adjacent the right end 20' thereof.

The backrest 16 preferably includes an integral, fold-down auxiliary or child seat 22. The auxiliary seat 22 is integrally recessed within the backrest 16, and includes a bottom panel or cushion 62 and a rear cushion 64 adjacent the bottom cushion. The bottom cushion 62 is pivotally movable between a stowed position shown in FIG. 1 and a deployed position shown in FIG. 2. In the stowed position, the bottom cushion 62 forces a spring-loaded hook out of a notch to positively lock the bottom cushion upright. To open the bottom cushion, a strap 65 can be pulled outwardly to move the hook out of the notch. After the cushion 62 opens slightly, the hook is rebiased to its original position awaiting reclosure of the cushion. In the deployed position, auxiliary seat restraints 23 are exposed.

Figure 3:
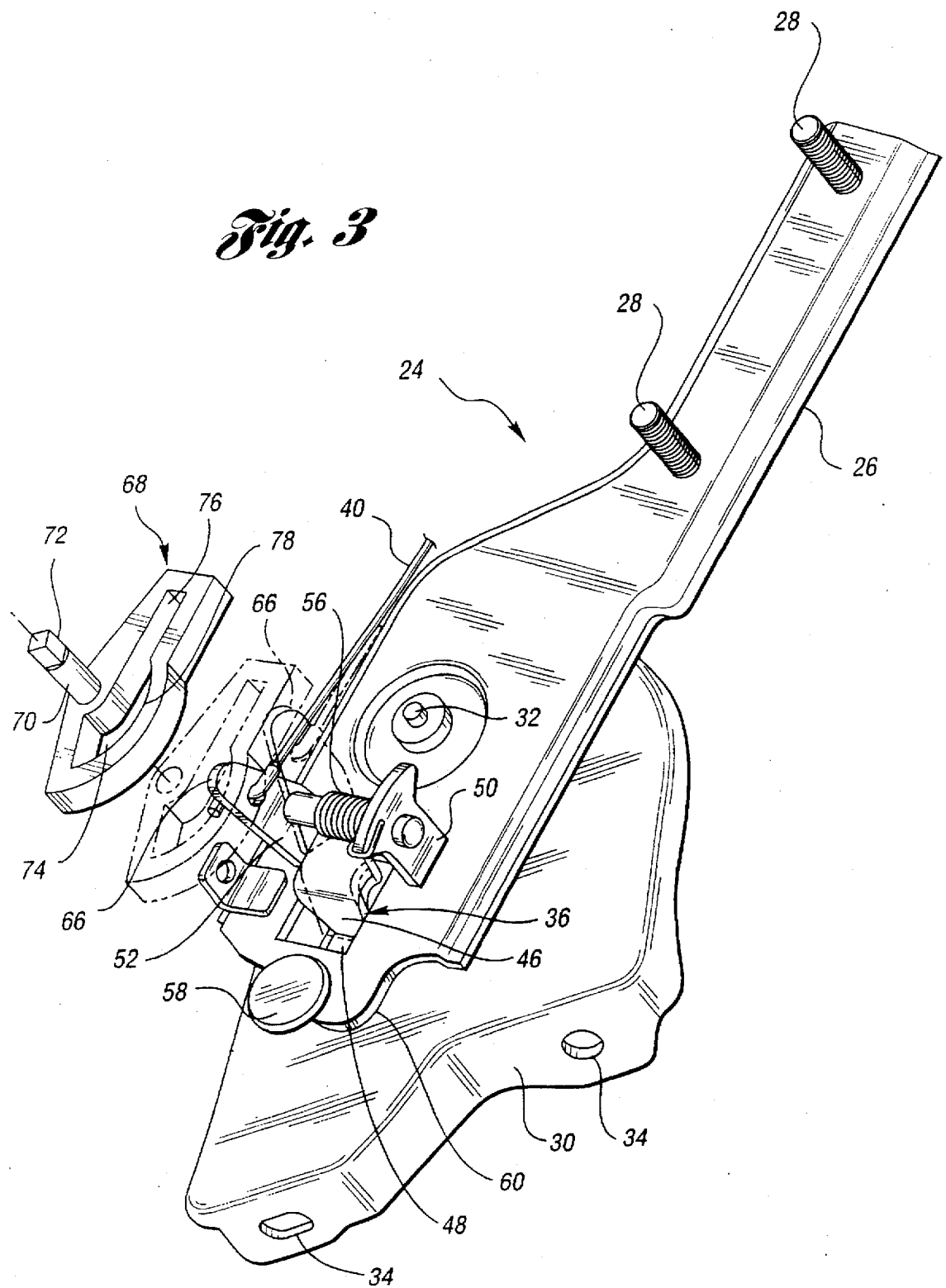
FIG. 3 is a perspective view of a seat latch assembly according to the present invention.
Figure 4:
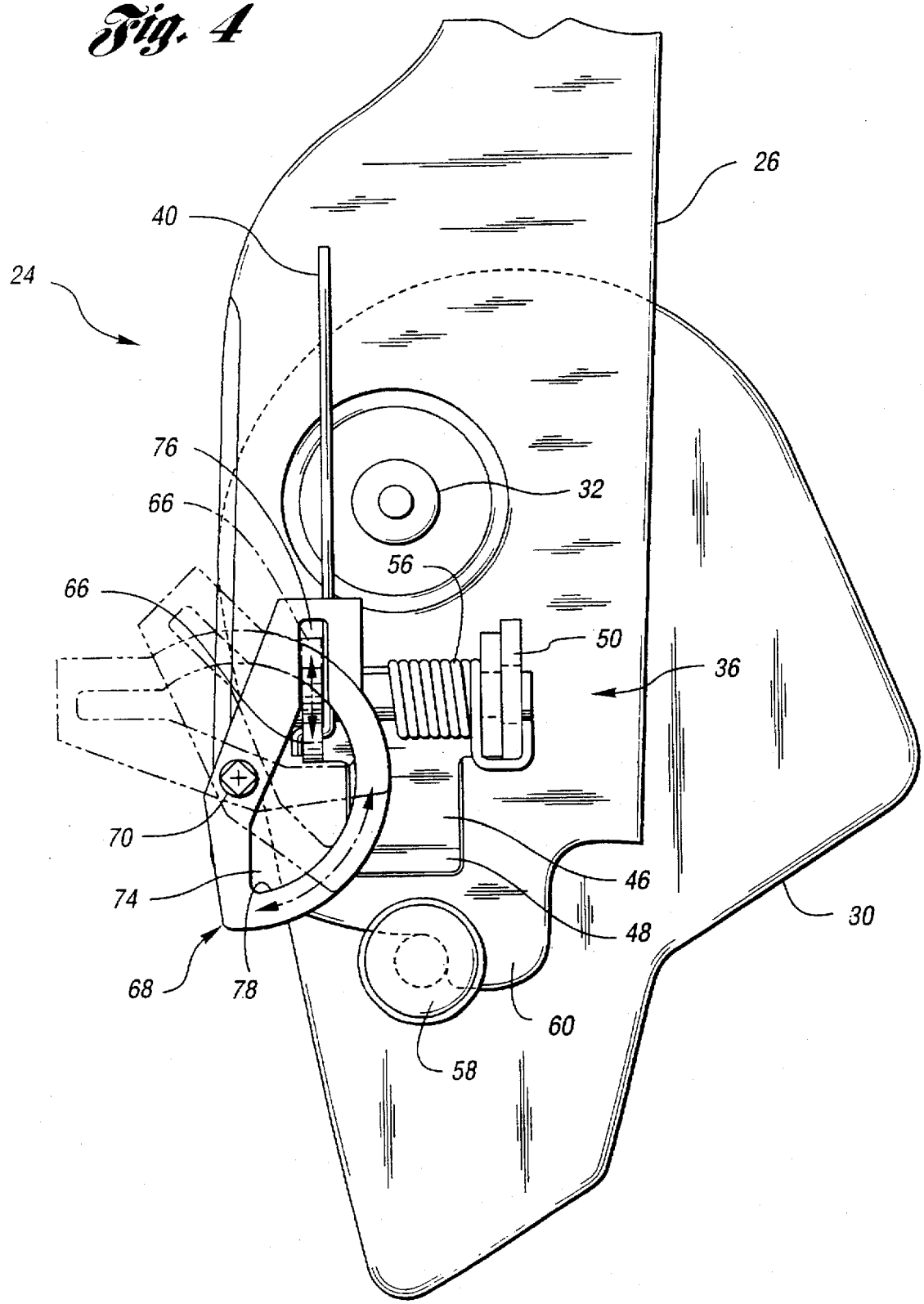
FIG. 4 is a partial side view of the seat latch.

FIGS. 3 and 4 show the hinge 24, which may take any of various forms known to those skilled in the art, but preferably includes a top bracket arm 26 fixedly attached at or near either one or both of the left end 18 and the right end 20 of the backrest 16. A pair of threaded studs 28 extend from the top bracket arm 26 to facilitate connection to the backrest 16. The hinge 24 also includes a bottom bracket arm 30 pivotally attached to the top bracket arm 26 by a hinge pin 32. Depending upon the particulars of the construction of the motor vehicle and of the seat portion 14, the bottom bracket arm 30 may be attached directly to the floor 10 in the passenger compartment through a pair of mounting holes 34. Alternatively, the bottom bracket arm 30 may be attached to the seat 14, which in turn is attached to the floor 10. Preferably, the top and bottom bracket arms 26 and 30 are fabricated from a heavy gauge metal stamping.

A seat latch 36 associated with the left end 18 of the backrest 16 selectively locks the backrest in the vertical use position. A flexible motion transmitting seat latch cable 40 operatively extends from the seat release lever 25 to actuate the seat latch 36. The cable 40 may be disposed within a protective sheath-like conduit (not shown) of the composite type having an inner tubular liner defining the internal boundaries of a core passage, at least one metallic supportive lay wire wrapped helically about the liner, and an outer cover disposed about the lay wire.

The seat latch 36 includes a latch finger 46 movably supported on the top bracket arm 26. A catch 48 is formed in the bottom bracket arm 30 for trapping the latch finger 46 in a locked condition to lock the backrest 16 in the vertical use position. When the latch finger 46 is thus seated in the catch 48, the top and bottom bracket arms 26 and 30 are immobilized relative to one another such that no rotation about the hinge pin 32 is possible. This in turn locks the left end 18 of the backrest 16 in the vertical use position.

The latch finger 46 is pivotally carried on a yoke support 50, which in turn is fixedly mounted on the top bracket arm 26. A crank 52 extends from the latch finger 46. The yoke support 50 includes a return spring 56 for continuously urging the latch finger 46 toward the locked condition seated in the catch 48. The seat latch cable 40 includes an S- or otherwise shaped terminal operatively connected to the crank 52 for controlling movement of the latch finger 46. That is, as the seat release lever 25 is manipulated as shown in phantom in FIG. 1, the seat latch cable 40 is tensioned, causing the crank 52 to pivot the latch finger 46 out of the catch 48 so that the backrest 16 can be folded to the non-use position. A post 58 extending from the bottom bracket arm 30 abuts a hook 60 on the top bracket arm 26 to prevent hyper-extension of the backrest 16.

The seat assembly 12 may include an inertial latch or a free pivoting latch on the end 18, 20 of the backrest 16 opposite from the seat latch 36. One such construction is shown in U.S. patent application Ser. No. 08/632,933, assigned to the assignee of the present invention and hereby incorporated by reference. As well known to those skilled in the art, an inertial latch may include a pendulum and a stop ledge to abut the pendulum whenever the pendulum has been rotated forwardly due to inertial forces caused by sudden deceleration.

A distal end 66 of the crank 52 extends into cooperation with a latch 68 mounted on the lower portion of the bottom cushion 62 to permit movement of the bottom cushion from the stowed position only when the backrest 16 is in the vertical use position. The latch 68 is fixedly mounted on the bottom cushion 62, preferably by a single bolt 70. To inhibit rotation of the latch 68 about the bolt 70, the end of the bolt may be provided with flats 72 for engagement with a fixed point on the auxiliary seat.

The latch 68 has a central opening 74 and an interior, generally linear groove 76 extending from the central opening. The central opening 74 is bordered in part by an arcuate, semi-circular surface 78 which is preferably of equal radius from the axis of rotation of the bolt 70. When the backrest 16 is in the vertical use position with the bracket arms 26 and 30 as shown in FIG. 3, the latch 68 is free to rotate in the counterclockwise direction as shown in FIG. 4 without obstruction from the distal end 66 of the crank 52, thus permitting deployment of the bottom cushion 62 of the auxiliary seat. With bottom cushion 62 and latch 68 rotated out of the stowed position as shown in phantom in FIG. 4, however, the latch finger 46 may not be lifted out of catch 48 by tensioning the cable 40 because the distal end 66 of the crank 52 interferes with the surface 78 of the latch 68.

When the auxiliary seat 22 is in its stowed position, the distal end 66 of the crank 52 is oriented with the only slightly wider groove 76 of the latch 68. The crank 52 can then be rotated to the position shown in phantom in FIG. 3 as the distal end 66 is drawn up without interference into the groove 76 as shown in phantom in FIG. 4. This allows the latch finger 46 to move out of registry with catch 48 and movement of backrest 16 relative to seat 14. While the backrest 16 is thus unlocked, the auxiliary seat 22 cannot be deployed owing to interference of the distal end 66 of the crank 52 with the sides of the groove 76. When the backrest 16 is returned to the vertical use position, the latch finger 46 snaps into the catch 48, locking the backrest relative to the seat and permitting movement of the bottom cushion 62.

It should be understood that while the forms of the invention shown and described above constitute preferred embodiments of the invention, they are not intended to illustrate all possible forms thereof. Other details and an alternative design of the vehicle seat may be found, for instance, in U.S. patent application Ser. No. 08/633,400, assigned to the assignee of the present invention and hereby incorporated by reference. It should also be understood that the words used are words of description rather than limitation, and various changes may be made without departing from the spirit and scope of the invention disclosed.

I claim:

1. A seat assembly comprising:
    a backrest movable between a use position and a substantially horizontal storage position;
    a bottom cushion;
    a first latch movable with the bottom cushion between a deployed position and a stowed position, the first latch having an opening and a groove extending from the opening; and
    a second latch movable between a first position locking the backrest in the use position and a second position, the second latch in its first position extending into the opening of the first latch and in its second position extending into the groove of the first latch.

2. The seat assembly of claim 1 wherein the first latch inhibits movement of the second latch from its first position when the first latch is not in the stowed position.

3. The seat assembly of claim 1 wherein the opening of the first latch includes an arcuate border.

4. The seat assembly of claim 3 wherein the first latch is pivotable about a pivot point, and the arcuate border has a substantially constant radius from the pivot point.

5. The seat assembly of claim 1 wherein the second latch includes a latch finger and a crank.

6. The seat assembly of claim 5 wherein the latch finger and the crank are integral.

7. The seat assembly of claim 5 wherein the latch finger extends generally transversely from the crank.

8. The seat assembly of claim 1 wherein the second latch is connected to the backrest.

9. The seat assembly of claim 1 wherein the first latch is connected to the bottom cushion.

10. The seat assembly of claim 1 wherein the first latch is fixedly connected to the bottom cushion.

11. The seat assembly of claim 1 wherein the first latch is fixedly connected to the bottom cushion with a single bolt.

12. The seat assembly of claim 1 wherein the backrest is connected to a seat.

13. The seat assembly of claim 1 wherein the bottom cushion in its stowed position is substantially recessed within the backrest.

14. The seat assembly of claim 1 wherein the second latch comprises an upper bracket arm and a lower bracket arm.

15. The seat assembly of claim 14 wherein the upper bracket arm is fixed to the backrest.

16. A seat assembly comprising:
- a backrest pivotable between a use position and a storage position generally adjacent a seat;
- an auxiliary seat including a bottom cushion pivotable between a deployed position and a stowed position substantially recessed within the backrest;
- a first latch fixedly connected to the bottom cushion and pivotable about a pivot point between the deployed position and the stowed position, the first latch having an opening and a groove extending from the opening, the opening including an arcuate border having a substantially constant radius from the pivot point; and
- a second latch including a lower bracket arm and an upper bracket arm connected to the backrest, the upper bracket arm including a latch finger and a crank, the second latch being movable between a first position where the latch finger engages a catch in the lower bracket arm to lock the backrest in the use position and a distal end of the crank extends into the opening of the first latch, and a second position where the latch finger does not engage the catch and the distal end of the crank extends into the groove of the first latch;
- the first latch inhibiting movement of the second latch from its first position when the first latch is not in the stowed position.

17. A seat assembly comprising:
- a backrest movable between a use position and a storage position;
- a bottom cushion;
- a first latch movable with the bottom cushion between a deployed position and a stowed position, the first latch having an opening and a groove extending from the opening, the opening including an arcuate border; and
- a second latch movable between a first position locking the backrest in the use position and a second position, the second latch in its first position extending into the opening of the first latch and in its second position extending into the groove of the first latch;
- the first latch being pivotable about a pivot point, the arcuate border having a substantially constant radius from the pivot point.

18. A seat assembly comprising:
- a backrest movable between a use position and a storage position;
- a bottom cushion;
- a first latch fixedly connected to and movable with the bottom cushion between a deployed position and a stowed position, the first latch having an opening and a groove extending from the opening; and
- a second latch movable between a first position locking the backrest in the use position and a second position, the second latch in its first position extending into the opening of the first latch and in its second position extending into the groove of the first latch.

19. A seat assembly comprising:
- a backrest movable between a use position and a storage position;
- a bottom cushion;
- a first latch movable with the bottom cushion between a deployed position and a stowed position, the first latch having an opening and a groove extending from the opening; and
- a second latch movable between a first position locking the backrest in the use position and a second position, the second latch in its first position extending into the opening of the first latch and in its second position extending into the groove of the first latch;
- the second latch comprising an upper bracket arm and a lower bracket arm, the upper bracket arm being fixed to the backrest.

* * * * *